US006892349B2

United States Patent
Shizuka et al.

(10) Patent No.: US 6,892,349 B2
(45) Date of Patent: May 10, 2005

(54) INFORMATION PROCESSING APPARATUS, METHOD AND PROGRAM FOR DISPLAYING ONE OR MORE CHARACTERS ON A PLURALITY OF APPLICATION DISPLAY AREAS RESPONSIVE TO SCENARIO INFORMATION

(75) Inventors: Utaha Shizuka, Tokyo (JP); Satoshi Fujimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 465 days.

(21) Appl. No.: 09/947,319

(22) Filed: Sep. 6, 2001

(65) Prior Publication Data

US 2002/0075313 A1 Jun. 20, 2002

(30) Foreign Application Priority Data

Sep. 7, 2000 (JP) ........................................ 2000-272246

(51) Int. Cl.⁷ ................................................ G06F 3/14
(52) U.S. Cl. ........................ 715/706; 715/708; 715/709; 715/716; 345/474
(58) Field of Search ................................. 345/706, 708, 345/709, 474, 473, 705, 764, 629, 634, 638, 977, 846, 839, 978, 727; 719/313, 317, 320, 328, 329, 312; 434/428, 365, 118; 715/706, 708, 709, 705, 964, 977, 846, 839, 978, 727, 719, 716, 717, 720, 723

(56) References Cited

U.S. PATENT DOCUMENTS

| | | | | |
|---|---|---|---|---|
| 5,657,462 A | * | 8/1997 | Brouwer et al. | 345/709 |
| 5,682,469 A | * | 10/1997 | Linnett et al. | 345/473 |
| 5,715,416 A | * | 2/1998 | Baker | 345/839 |
| 5,727,174 A | * | 3/1998 | Aparicio et al. | 345/705 X |
| 5,752,239 A | * | 5/1998 | Coutts | 345/473 X |
| 6,533,584 B1 | * | 3/2003 | Jenkins et al. | 434/118 X |

\* cited by examiner

*Primary Examiner*—Raymond J. Bayerl
(74) *Attorney, Agent, or Firm*—Frommer Lawrence & Haug LLP; William S. Frommer

(57) ABSTRACT

To project a character with story properties among a plurality of application softwares or on the desktop screen, and to instruct the user on the operating procedure. A character control section (5) provides character data from character data storage section (7) to application softwares (2), (3) and (4) or a basic software on the basis of scenario information from scenario information storage section (6). The application softwares (2), (3) and (4) communicates with the character control section (5) to give scenario information to the character control section (5), and to obtain the character data. Thus, the application softwares (2), (3) and (4) obtain the state of the characters or image information, and display the characters on the respective application windows on the basis of scenario information.

10 Claims, 13 Drawing Sheets

INFORMATION PROCESSING APPARATUS, METHOD AND PROGRAM FOR DISPLAYING ONE OR MORE CHARACTERS ON A PLURALITY OF APPLICATION DISPLAY AREAS RESPONSIVE TO SCENARIO INFORMATION

BACKGROUND OF THE INVENTION

1. Field of the Invention

The present invention relates to an information processing apparatus for executing an application software in cooperation and an application software execution method, and a recording medium which records an application software execution program.

2. Description of Related Art

Among computer apparatuses which execute an application software under a basic software while displaying the application software on display means, there is a one in which specific characters are displayed as a predetermined software is executed to show the operating procedure to a user. In this case, the character is a one which is specific to the application software, which is additionally prepared by a preparer when an application software is prepared, or which is prepared later for the application software by the user.

SUMMARY OF THE INVENTION

It is therefore an object of the present invention to provide an information processing apparatus, an application software execution method, and a application software execution program, in which characters are allowed to appear with story properties among a plurality of application softwares or on a desktop screen to execute the plurality of application softwares in cooperation or to teach a user the operating procedure.

According to the present invention, there is provided an information processing apparatus for executing a plurality of application softwares under a basic software while displaying said plurality of application softwares on display means, comprising character data storage means for storing data of character to be projected on a screen displayed to follow a start of said basic software, or on each of application display areas caused by executing said plurality of application softwares, scenario information storage means for storing scenario information of said application softwares, and character control means for projecting said characters on said plurality of application display areas and/or on the screen displayed to follow the start of the basic software by using character data stored by said character data storage means and said scenario information stored by said scenario information storage means.

According to the present invention, there is also provided an application software executing method for executing a plurality of application softwares under a basic software while displaying the plurality of application softwares on display means, said method comprising a step of projecting a character on a plurality of application display areas which are caused by executing said plurality of application softwares, and/or on a screen displayed to follow a start of said basic software, by using character data from character data storage means for storing data of the character to be displayed on each of said plurality of application display areas and scenario information from scenario information storage means for storing the scenario information of said application softwares.

According to the present invention, there is also provided an application software execution program for executing a plurality of application softwares under a basic software while displaying said plurality of application softwares on display means, wherein a character is projected on a plurality of application display areas which are caused by executing said plurality of application softwares, and/or on a screen displayed to follow a start of said basic software, by using character data from character data storage means for storing data of the character to be displayed on each of said plurality of application display areas and scenario information from scenario information storage means for storing the scenario information of said application softwares.

BRIEF DESCRIPTION OF THE DRAWINGS

FIGS. 10A and 10B illustrate a constitutional view of a system for projecting a moving character T on a moving image or a still image photographed by a digital camera or the like.

FIG. 13 is a flow chart showing the process of a system for projecting a moving character T on a moving image or a still image photographed by a digital camera or the like.

DESCRIPTION OF THE PREFERRED EMBODIMENTS

The embodiment of the present invention will be described hereinafter with reference to the drawings. In this embodiment, there is illustrated a computer apparatus which executes a plurality of application softwares while displaying the plurality of application softwares on display means under a basic software.

Figure 1:
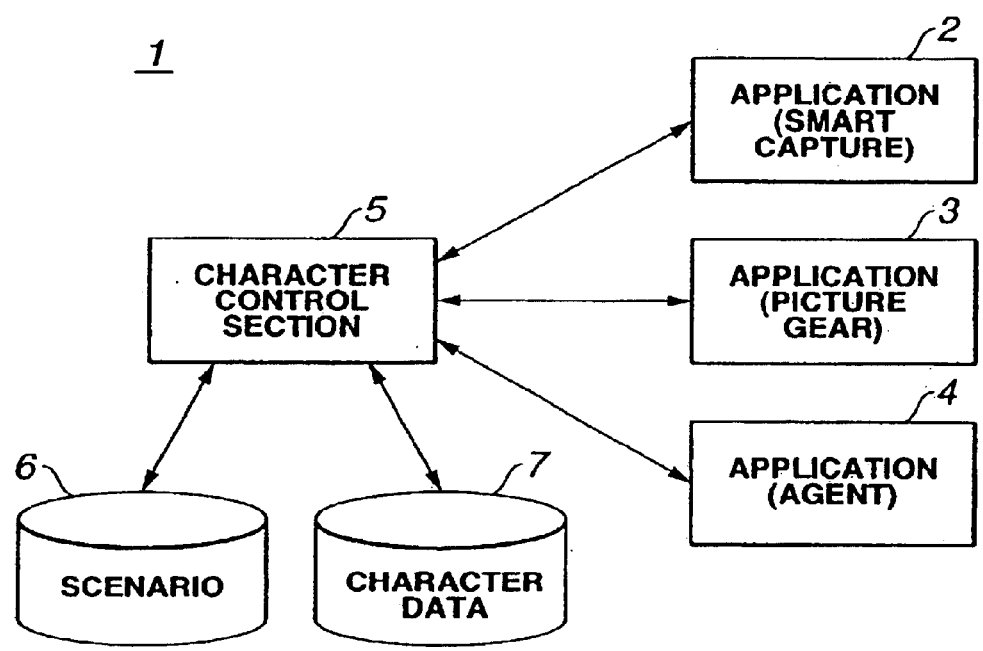
FIG. 1 is a functional block diagram schematically showing a computer apparatus according to an embodiment of the present invention.

FIG. 1 schematically shows the computer apparatus 1. In FIG. 1, the computer apparatus 1 comprises application softwares 2, 3 and 4 executed on CPU described later, a character control section 5 for communicating with the application softwares 2, 3 and 4 to control characters described later on the basis of scenario information of the application softwares, and a character data storage section 7 and a scenario information storage section 6 connected to the character control section 5 to provide data of characters and scenario information.

The specific examples of the application softwares 2, 3 and 4 is now described. The specific example of the application software 2 is a tool for capturing still images or moving images photographed with a digital video camera, such as a Smart Capture (Trademark). The specific example of the application software 3 is a Picture Gear (Trademark) which is an image viewer and an image shaping tool. The image captured by the Smart Gear can be displayed in slide show by the Picture Gear. The specific example of the application software 4 is an agent program for displaying the character itself.

A character data storage section 7 stores data of characters which is projected on the desktop screen which is displayed just after the start of a basic software (Operating System: OS) or the application window displayed when the application softwares 2, 3 and 4 are executed. In the computer apparatus 1, for example, a hard disc drive (HDD) or a magnetic disc, an optical disc, an optical magnetic disc, and a semiconductor memory are served as the character data storage section 7.

The scenario information storage section 6 stores scenario information of the respective application softwares. In the computer apparatus, for example, a hard disc drive (HDD) or a magnetic disc, an optical disc, an optical magnetic disc, and a semiconductor memory are employed as the scenario information storage section, similarly to the character data storage section 7.

The character control section 5 controls character data stored in the character data storage section 7 on the basis of scenario information stored in the scenario information storage section 6, and projects the characters with story properties on the application windows which is displayed when the application softwares 2, 3 and 4 are executed, or on the desktop screen. For this, the character control section 6 accordingly provides the characters from the character data storage section 7 to the application softwares 2, 3 and 4 or the basic software on the basis of scenario information from the scenario information storage section 6. The character control section 5 is operated by CPU of the computer apparatus.

The application softwares 2, 3 and 4 communicates with the character control section 5 to provide scenario information to the character control section 5 and to obtain the character data. Then, they obtain the state of characters or image information, and displays the characters on the respective application windows on the basis of the scenario information. The communication between the character control section 5 and the application softwares 2, 3 and 4 will be described later.

Figure 2:
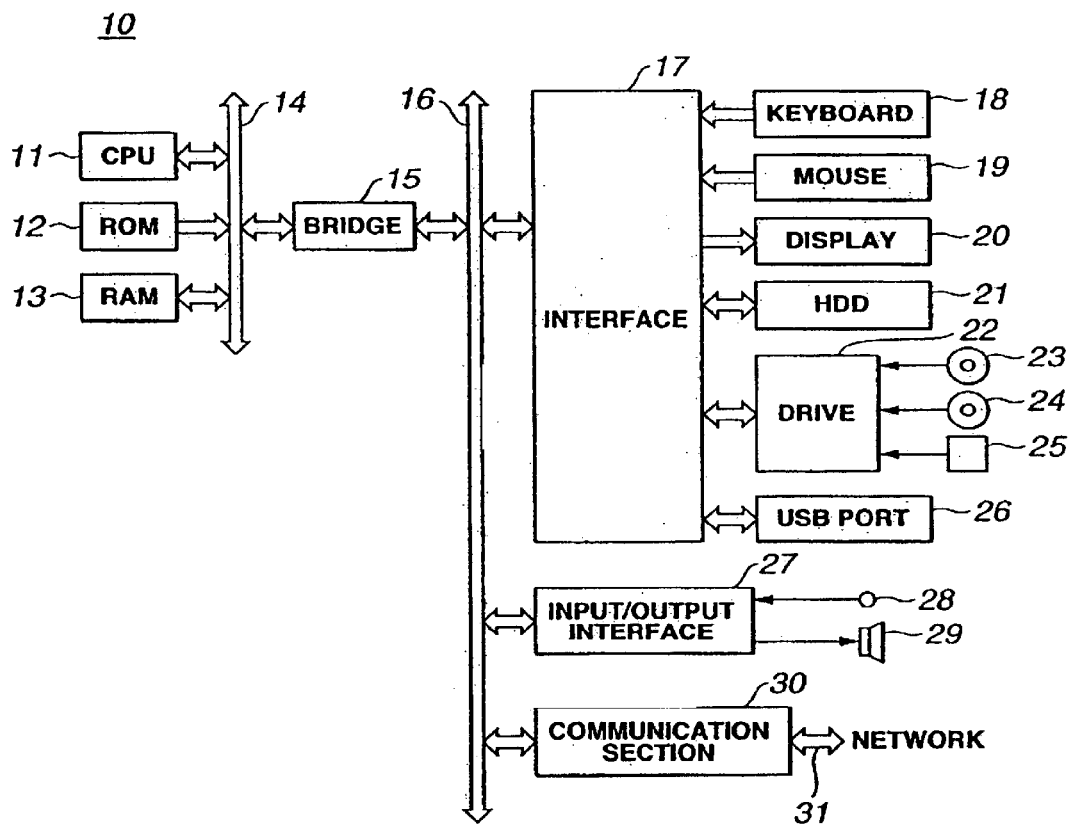
FIG. 2 is a block diagram showing the constitution of the computer apparatus in detail.

Next, the detailed constitution of the computer apparatus 1 shown schematically in FIG. 1 is described with reference to a computer apparatus 10 shown in FIG. 2. A CPU (Central Processing Unit) 11 executes programs based on the application software execution method according to the present invention, a plurality of application softwares, and an OS (Operating System). The CPU 11 also functions as the character control section 5 shown in FIG. 1.

A ROM 12 generally stores programs used by the CPU 11 and basically fixed data among parameters for operation. A RAM 13 stores programs used for the execution of the CPU 11 and parameters suitably changed for the execution.

A host bus 14 is connected to an external bus 16 such as a PCI (Peripheral Component Inter connect/Interface) bus through a bridge 16.

A keyboard 18 is operated by a user for inputting various commands into the CPU 11. A mouse 19 is operated by the user for instructing and selecting points on the screen of a display 20. The display 20 comprises a liquid crystal display device or a CRT (Cathode Ray Tube) to display various information with texts or images. A HDD (Hard Disc Drive) 21 drives a hard disc to record or reproduce programs or information executed by the CPU 11. In the present embodiment, the HDD stores programs or a plurality of application softwares based on the application software execution method in advance. Then, the HDD 21 reproduces the programs to supply the program to the RAM 13. The HDD 21 also functions as the character data storage section 7 and the scenario storage section 6 shown in FIG. 1.

A drive 22 reads data or programs recorded in a magnetic disc 23, an optical disc (including CD), an optical magnetic disc 24, or a semiconductor memory 25 to supply the data or programs to the RAM 13 connected through the interface 17, the external bus 16, the bridge 15 and the host bus 14. Programs or a plurality of application softwares based on the application software execution method may be recorded in advance in the magnetic disc 23, the optical disc (including CD), the optical magnetic disc 24, or the semiconductor memory 25. Further, they may function as the character data storage section 7 or the scenario information storage section 6.

A portable device not shown is connected to a USB (Universal Serial Bus) port 26 through a USB cable. The USB port 26 outputs data (e.g., contents or command of the portable device) supplied from the HDD 21, the CPU 11 or RAM 13 through the interface 17, the external bus 16, the bridge 15 or the host bus 14 to the portable device.

The keyboard 18 to the USB port 26 are connected to the interface 17, which is connected to the CPU 11 through the external bus 16, the bridge 15 and the host bus 14.

A voice input/output interface 27 executes a interface processing of digital voice input/output or analogue input/output supplied from an input terminal 28. A loud speaker 29 outputs a predetermined voice corresponding to contents on the basis of a voice signal supplied from the voice input/output interface 27.

A communication section 30, to which is connected a network 31, stores data (for example, such as a request for registration, a request for transmission of contents, or the like) supplied from the CPU 11 or HDD 21 in a packet of a predetermined system, transmits the data through the network 31, and outputs data (e.g., a certification key or contents, etc.) stored in the packet received to the CPU 11, the RAM 13 or HDD 21 through the network 31.

Figure 3:
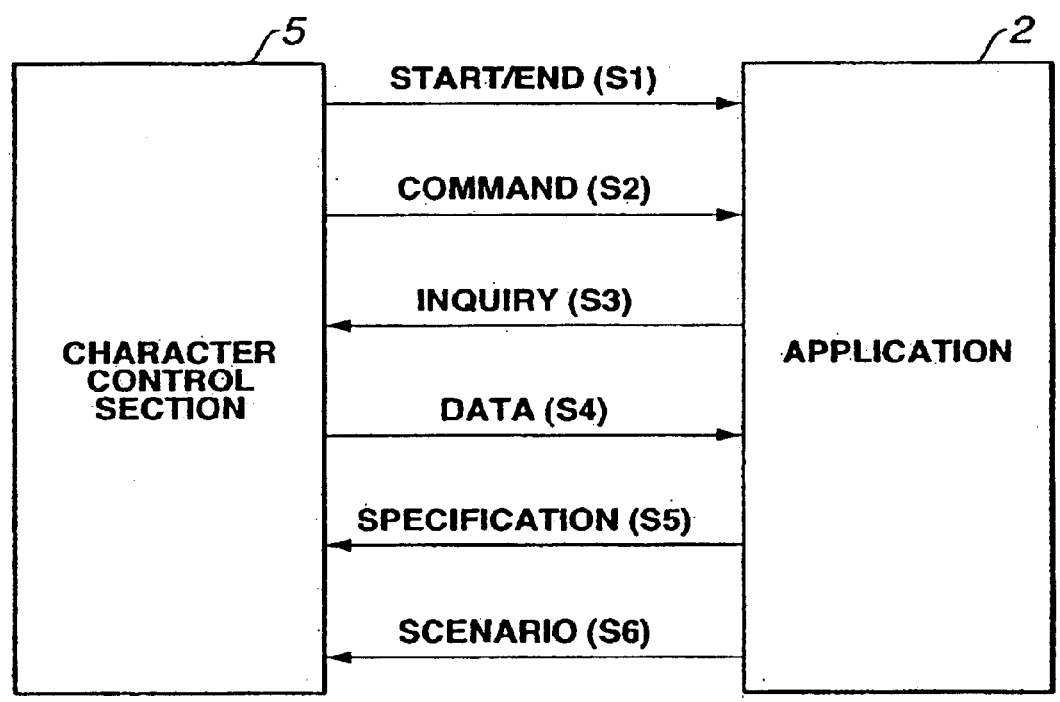
FIG. 3 is a view for explaining the communication process between a character control section and an application software.

Next, the communication between the character control section 5, and for example, the application software 2 such as the Smart Capture or the application software 3 such as the Picture Gear will be explained with reference to FIG. 3. The character control section 5 starts the application softwares 2 and 3 (S1). The character control section 5 then transmits a command for displaying in slide show a captured image to the application software 2 (S2), Then, the application software 2 or 3 inquires the character control section 5 about the present position of the character (S3). In response to this inquiry, the character control section 5 provides, as character data, the present position, shape, feeling parameter, operating pattern, and voice information of the character (S5).

Next, the application software 2 or 3 sends the display ability of its own color expression or tone, and specification information relating to the voice ability to the character control section 5 (S5). Further, the application software 2 or 3 makes the way of using the application software into a series of scenario information to give it to the character control section 5 (S6). The character control section 5 stores the scenario information, for example, in the HDD or other media, and instructs commands such as "Raise Smart Capture!" or "Select Effect!" on the basis of the scenario information to the application software 2.

The operation when the computer apparatus 1 drives the program based on the application software execution method according to the present invention will be explained with reference to FIGS. 4 to 9. The program is read from the medium such as HDD and stored in the RAM 14, after which the program is executed by the CPU 11. Further, the CPU also functions as the character control section 5 as described above. Hereinafter described is the operation in which the user input the command for slide show display after the OS is initiated. For the slide show display, the application software 2 "Smart Capture" and the application software 3 "Picture Gear" are necessary to be executed. Furthermore, the software "Still View"should be also initiated, which software is used for photographing the character being synthesized with a photographed image as a still image, and for displaying the still image in the slide show. Here, as a specific example for executing a plurality of application softwares in cooperation, described is the example in which "Smart Capture" and the software "Still View" for photographing a still image are started in accordance with the instructions of the characters, and "Picture Gear" is executed automatically.

Figure 4A:
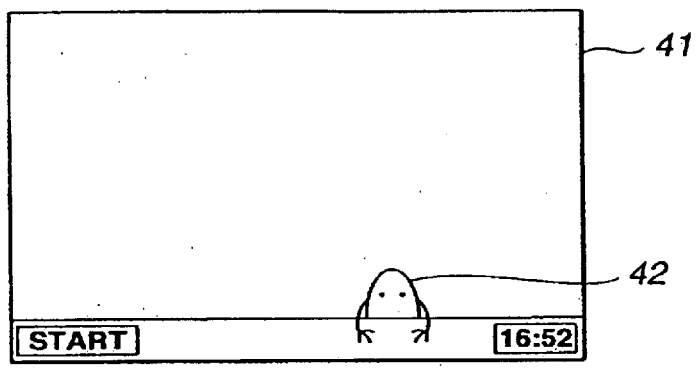
FIGS. 4A, 4B and 4C illustrate a first operation explanatory view for explaining the operation when the computer apparatus drives a program on the basis of an application software execution method.
Figure 4B:
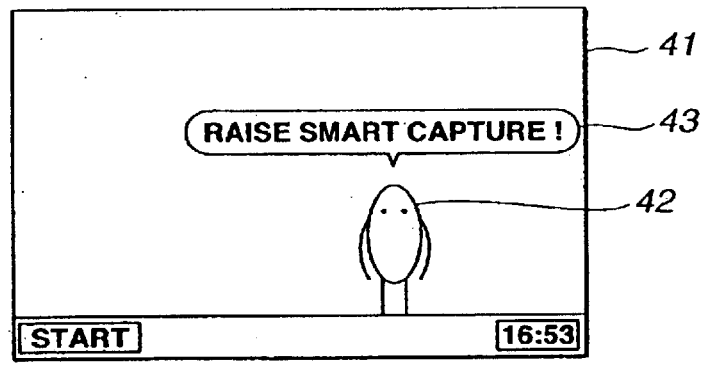

First, in FIG. 4A, a character T42 appears so that the half of the body leans out from the lower part of a desktop screen 41. Then, as shown in FIG. 4B, the whole body appears on the desktop screen 41 to display a character frame 42 "Raise Smart Capture!". The user clicks "Smart Capture" on the task bar in accordance with the instructions.

Figure 4C:
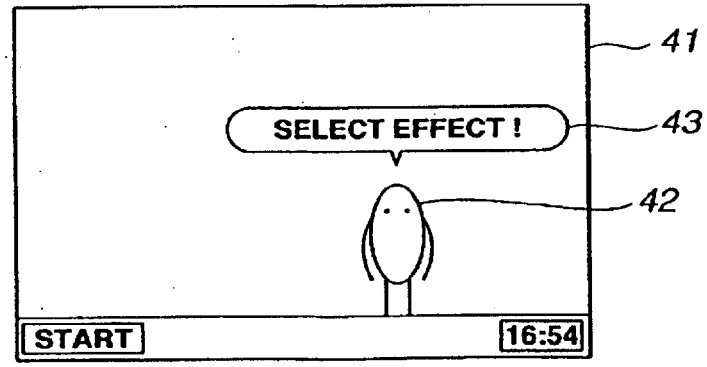
Figure 5A:
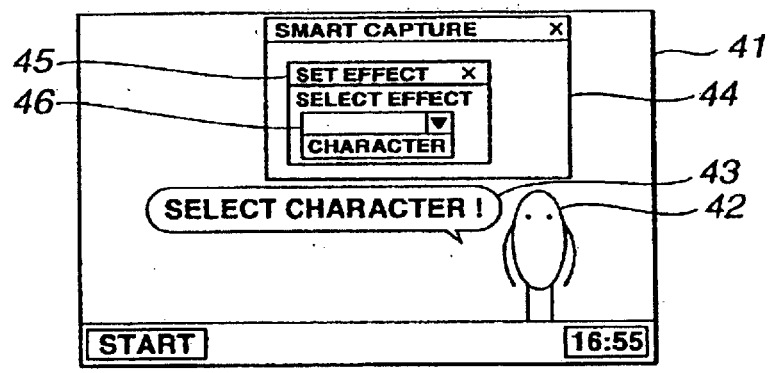
FIGS. 5A, 5B and 5C illustrate a second operation explanatory view for explaining the operation when the computer apparatus drives a program on the basis of an application software execution method.

Next, as shown in FIG. 4C, a character frame 43 "Select Effect!" is displayed on the desktop screen 41 as if a character T42 talks, and then, as shown in FIG. 5A, an effect setting screen 45 is displayed on a dialogue 44 of the Smart Capture to display the kind of the effect in a pull down display area 46.

Figure 5B:
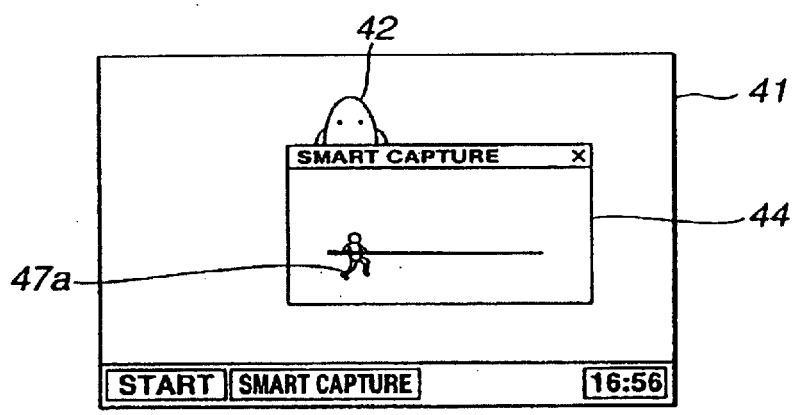
Figure 5C:
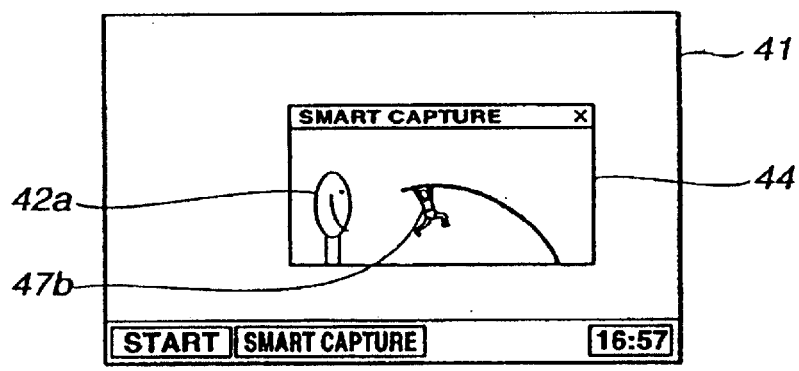

Then, as shown in FIG. 5B, a character T2 goes up to the upper part of the dialogue 44 and operates as if the character T2 enters the dialogue. For example, one frame of a moving image photographed by a digital camera is projected in the dialogue 44. The moving image photographed by the digital camera is captured into the computer apparatus 10 through the semiconductor memory 25 or the magnetic disc 23 and the optical disc 24 mounted on the drive 22 of FIG. 2. It may be taken into the HDD 21. Here, a pole-vaulter (player) is projected, as a state 47a, on the one frame. A character T42 enters next one frame as shown in FIG. 5C and is projected together with a state 47b of the player (Character T42a).

Figure 6A:
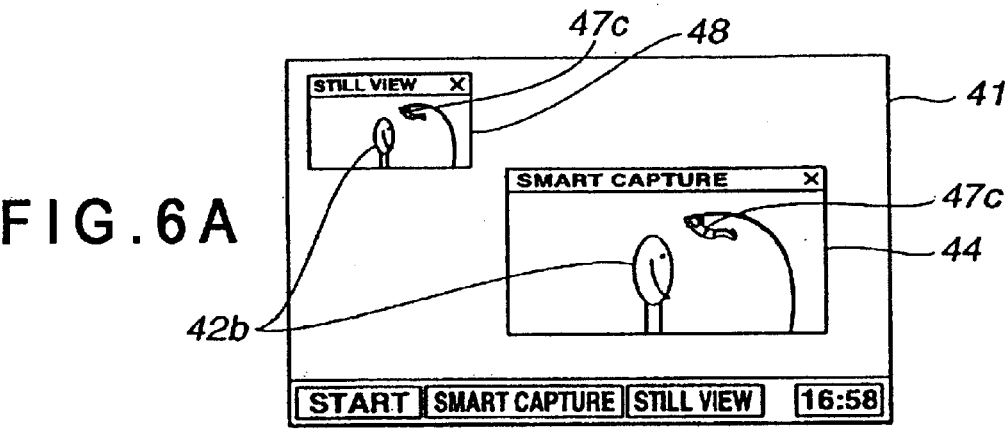
FIGS. 6A, 6B and 6C illustrate a third operation explanatory view for explaining the operation when the computer apparatus drives a program on the basis of an application software execution method.
Figure 6B:
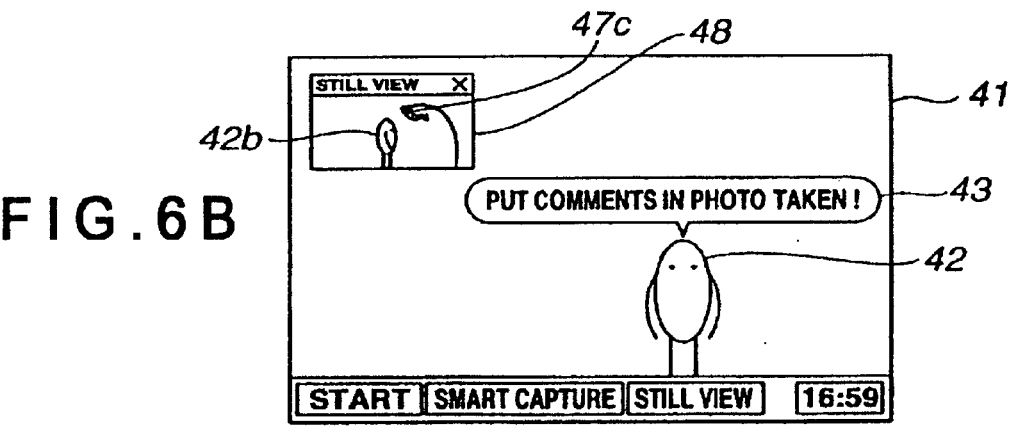

The character T42 also starts to move as shown in FIG. 6A together with the movement of the moving image to become a character T42b whose position is moved. The technique for projecting the character T42 showing the above movement together on the moving image and the still image photographed by the digital camera or the like will be mentioned later.

Figure 6C:
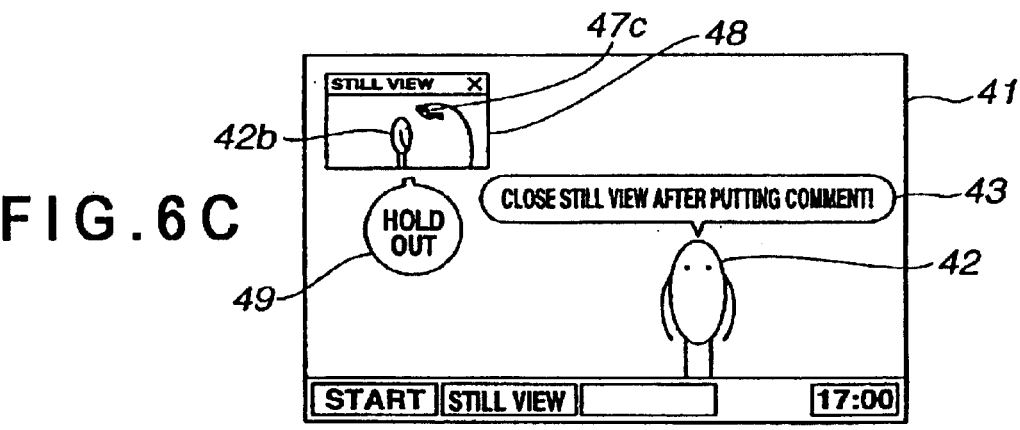

In FIG. 6A, the application software for photographing a still image called "Still View" is executed to photograph still images when the character is T42b and the player is in the state 47c. Next, the character T42 instructs "Put comments in a photo taken!" in the character frame 43 of FIG. 6B. Then, the user puts a comment "Hold out!" with a keyboard or the like as shown in FIG. 6C, and the character T42, in response, displays the character frame 43 "Close still view after putting comment!" so that the still view be closed.

Figure 7A:
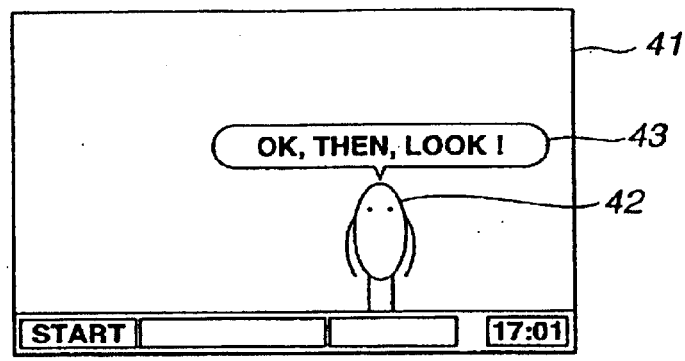
FIGS. 7A, 7B and 7C illustrate a fourth operation explanatory view for explaining the operation when the computer apparatus drives a program on the basis of an application software execution method.
Figure 7B:
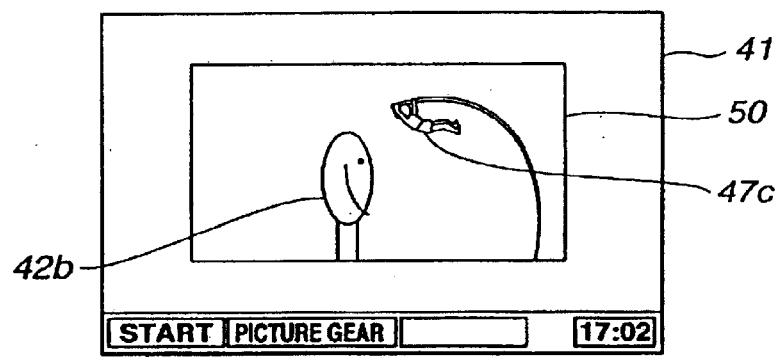
Figure 7C:
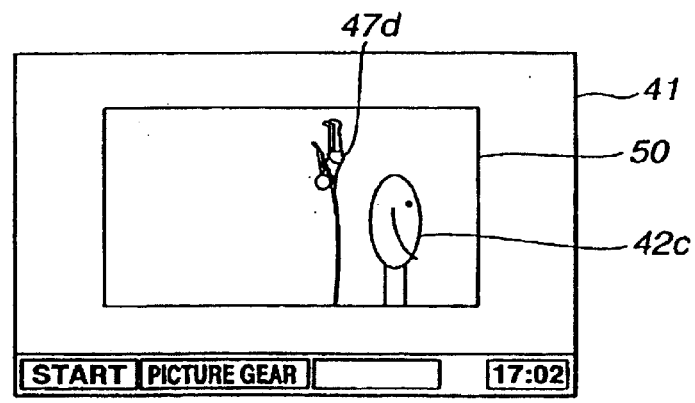

Then, the character T42 informs "OK, then, look!" in the character frame 43, as shown in FIG. 7A from the desktop screen 41, and executes the slide show of a photographed image obtained by the Smart Capture and the Still View using the Picture Gear mentioned as a specific example of the application software 3 as shown in FIG. 7B and FIG. 7C.

Figure 8A:
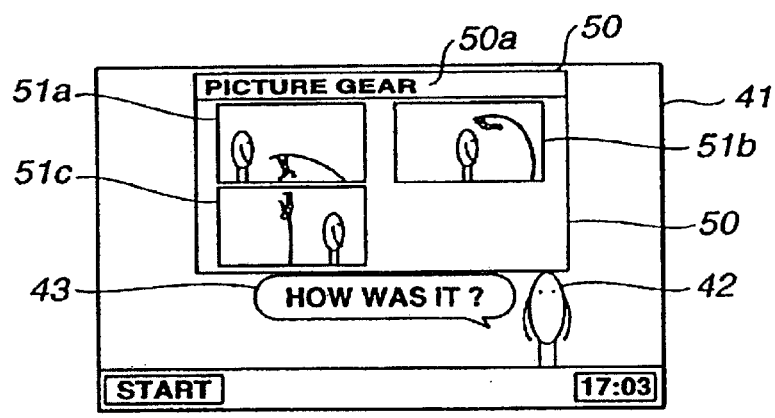
FIGS. 8A and 8B illustrate a fifth operation explanatory view for explaining the operation when the computer apparatus drives a program on the basis of an application software execution method.
Figure 8B:
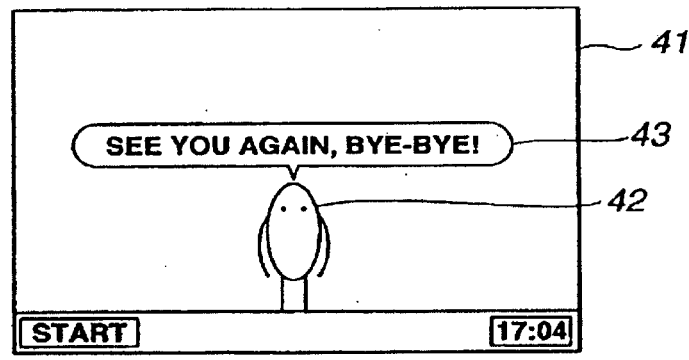

As shown in FIG. 8A, a Picture Gear 50a is displayed on a Picture Gear dialogue 50, and images 51a, 51b and 51c displaying the slide show are displayed at the same time. At this time, the character T42 uses a character frame "How was it?". Finally, "See you again, bye-bye" is displayed on the character frame 43 to complete the operation, as shown in FIG. 8B.

Figure 9A:
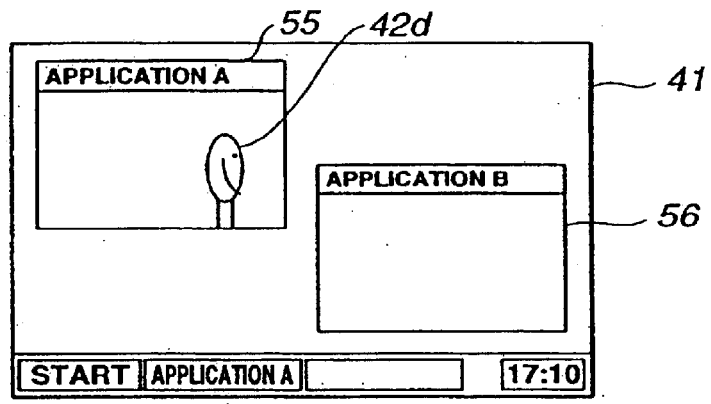
FIGS. 9A, 9B and 9C illustrate a sixth operation explanatory view for explaining the operation when the computer apparatus drives a program on the basis of an application software execution method.
Figure 9B:
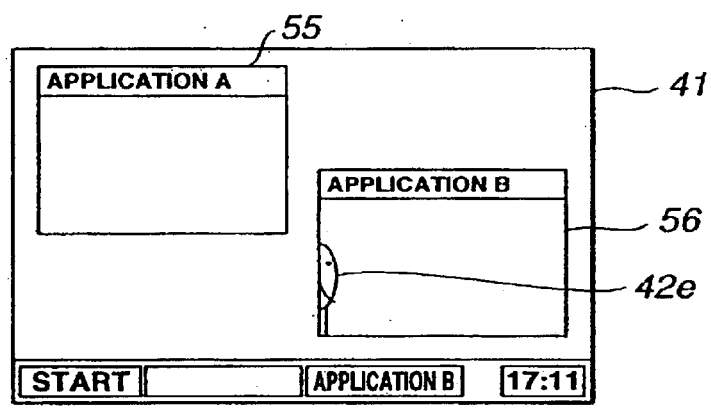
Figure 9C:
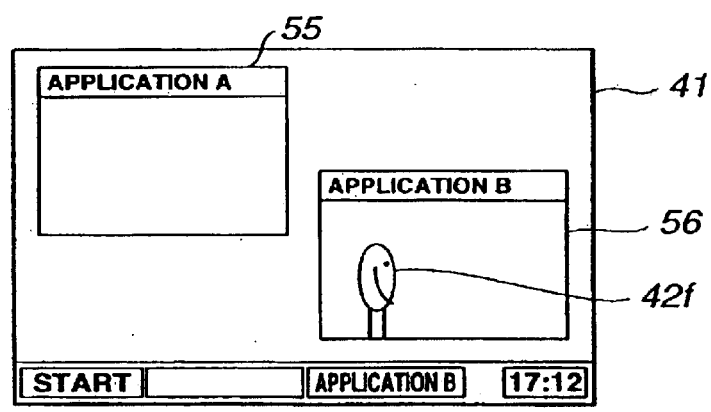

The character control section 5 controls the character data on the application software programs 2, 3 and 4 so that the same characters are not present at the same time on a plurality of application windows and the desktop screen. FIGS. 9A–C are views showing the character T42 displayed on application windows 55 and 56 of two application softwares A and B. First, in FIG. 9A, the application software A is active, and a character 42d is displayed. Next, when the application software B is active, a character 42e starts to appear within the application window 56 as shown in FIG. 9B, and then, a figure thereof completely appears as shown in FIG. 9C (character T42f).

That is, in this embodiment, one character can be displayed as if it comes and goes freely on the desktop screen or a plurality of application windows.

Further, in this embodiment, with the execution of a predetermined application software, the operating procedure is displayed on the application window or the desktop screen using the character.

Next, the technique for projecting the character T42 showing the above movement together on the moving image and the still image photographed by the digital camera or the like will be explained with reference to FIGS. 10 to 13.

This technique is applied as one of effect functions of Smart Capture for capturing (photographing) moving images and still images.

Conventionally, as for the effect function described above, there was a function for attaching a still images to a captured image called "frame".

Meanwhile, conventionally, since a still image is attached, only one pattern could be produced with respect to one picture (photographed image).

In the present embodiment, the function called "Frame" is used for a moving image to enable producing various pictures according to timing for photographing.

That is, for example, a image (a moving image) produced as a bit map image is combined with the input of moving images or the input of still images. A still image of every frame of the produced image is photographed with the input of moving images or the input of still images being overlayed so that a combined image of a plurality of patterns can be obtained.

Figures 10A, 10B:
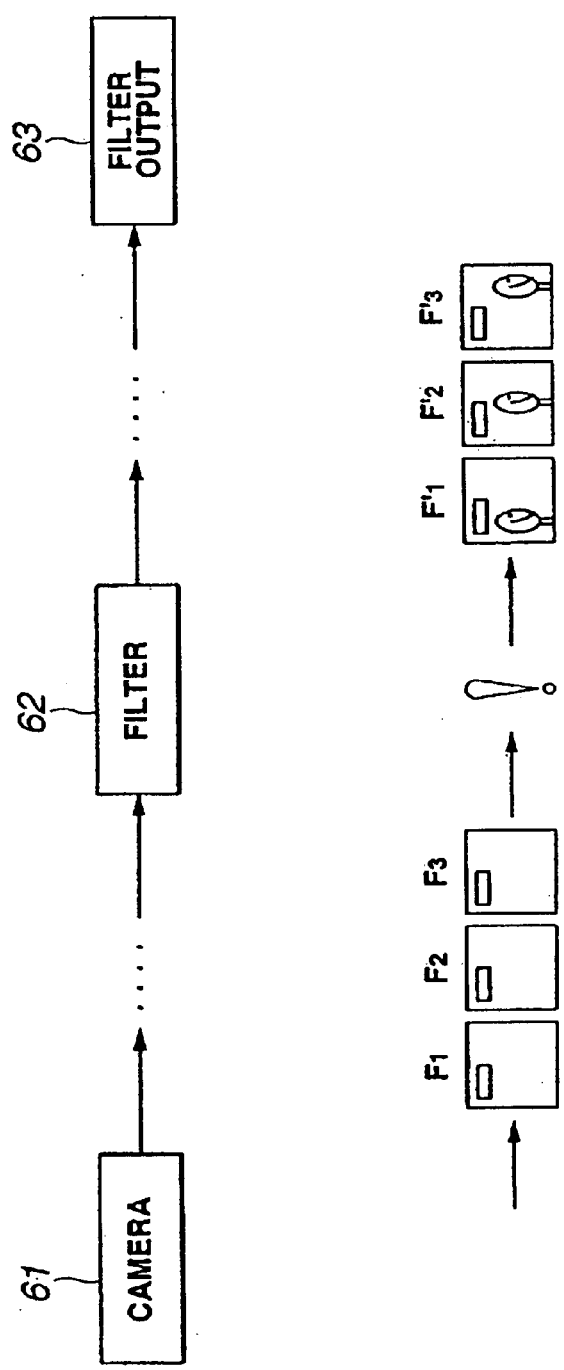

The constitution of a system for producing the combined image of a plurality of patterns is shown in FIG. 10A. As shown in FIG. 10A, this system comprises a camera 61, and a moving image filter 62 for still image and moving image photographing softwares, and a combined image of a plurality of patterns is output as a filter output 63.

The camera 61 photographs a moving image or a still image, and supplies an image signal constituting a moving image or a still image through the predetermined process not shown to the filter 62. As shown in FIG. 10B, in the filter 62, the produced image (a moving image) that has been already produced and stored in a storage medium, for example, such as HDD is taken out and attached to the photographed image (the original image) using a mask pattern.

Figure 11:
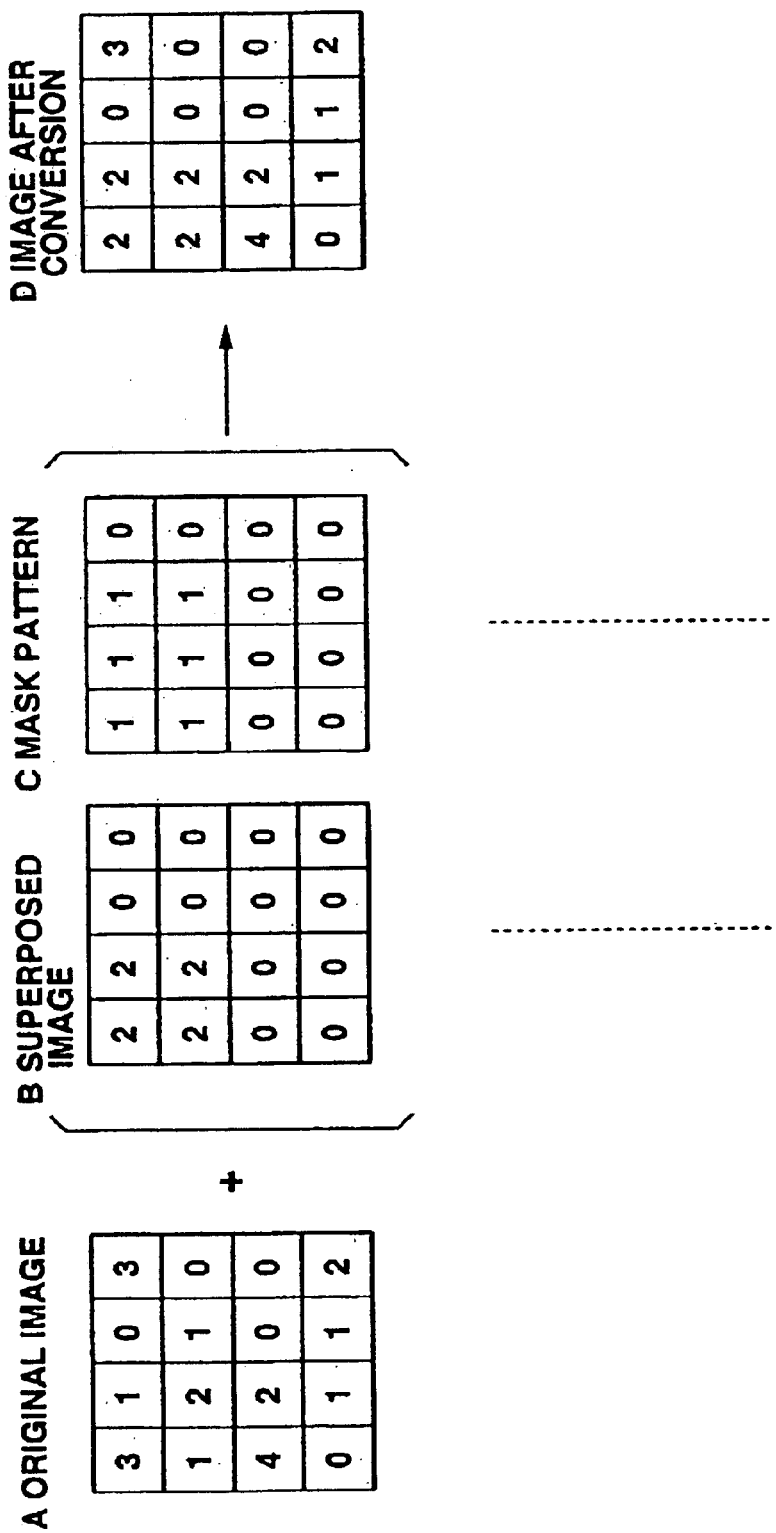
FIG. 11 is a view schematically showing the state that a produced image (an image B to be superposed) is synthesized with an original image A by using a master pattern C.

FIG. 11 schematically shows the state that the produced image (an image B to be superposed) is combined with the original image A using a mask pattern C. Particularly, here, the image to be superposed and the mask pattern are produced in each frame unit of the produced image (the moving image) and attached to the original image.

Figure 12A:
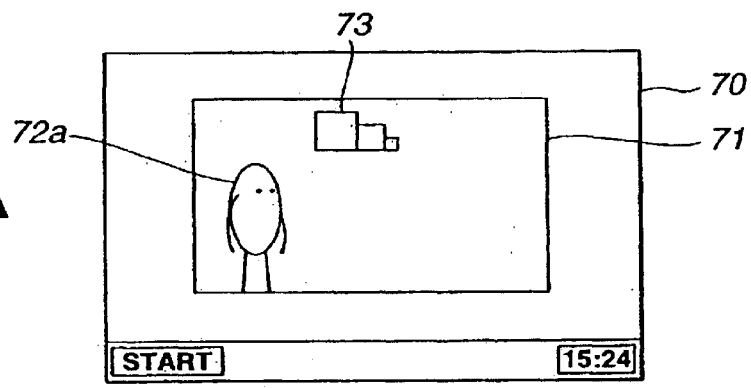
FIGS. 12A, 12B and 12C illustrate a view showing an image synthesized in an application diagram on the desktop screen.
Figure 12B:
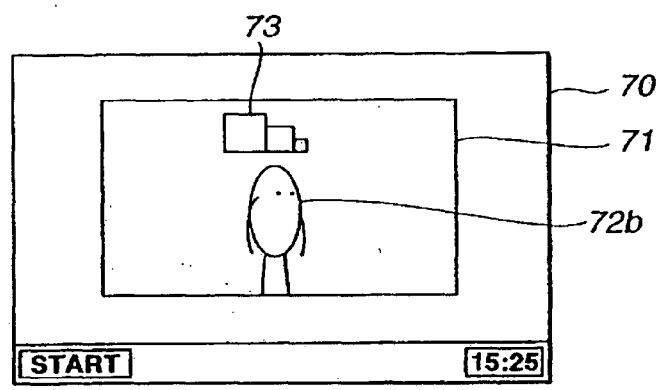
Figure 12C:
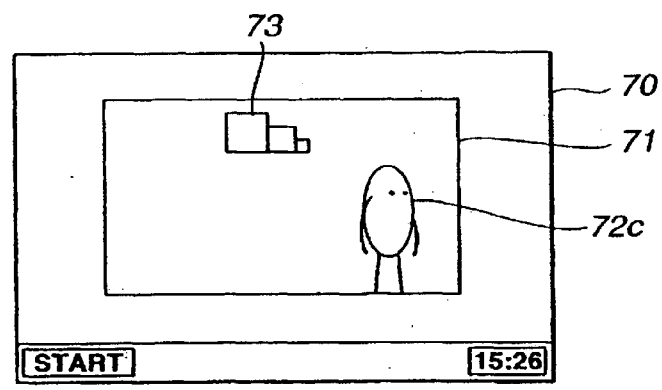

Thereby, as shown in FIGS. 12A, B and C, an image of a building 73 photographed and a produced image showing further movement, that is, characters T72a, 72b and 72c can be combined and displayed in an application diagram 71 on a desktop screen 41.

Figure 13:
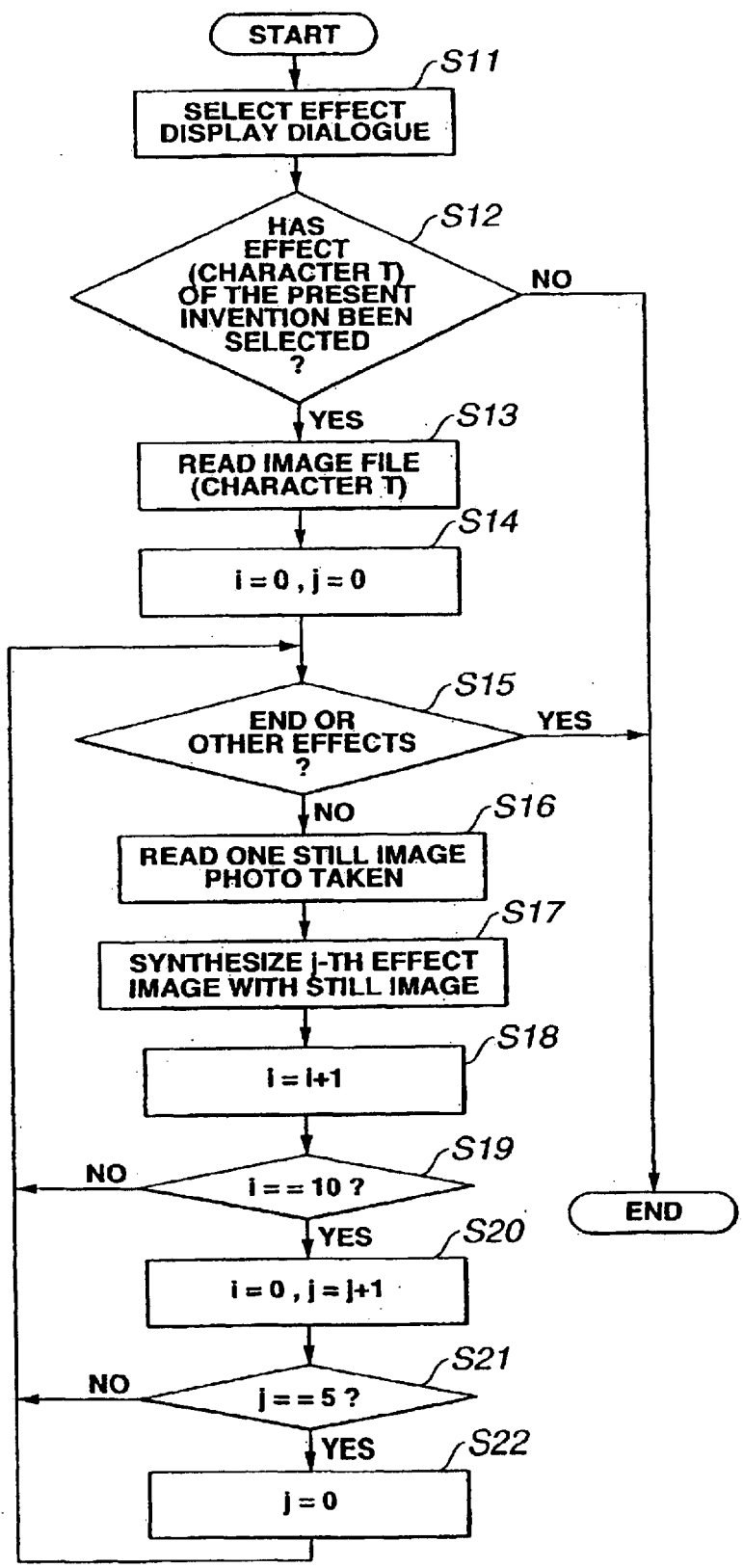

The processes described so far will be explained in the lump using a flow chart of FIG. 13. First, in Step S11, suppose for example that the effect function of the Smart Capture is selected. Next, when the effect (character) of the present invention is selected, the process proceeds to processes after Step S13. If not selected, the process ends.

In Step S13, an image file of the character T stored in the storage medium such as the HDD is read. Here, a plurality of bit map images prepared in advance are read. As a specific example, suppose that there are five images.

In Step S14, the order i of an image from the camera 61 and the order j of a bit map image from the image file are initialized into 0. Then, in Step S15, the following processes are repeated till judgment is made whether an end button is operated or other effects are selected.

Next, in Step S16, one still image photographed by the camera 61 is read. Suppose for example that the still image is read once per 1/10 second. The i-th bit map image (effect image) is combined with the still image read (Step S17). The i-th one out of five bit map images read in Step S13 is combined with the still image from the camera 61.

The order of the still images from the camera is incremented through the processes of Step S18 to Step S20, and when i becomes 10 (that is, every 0.1×10=1 second), a bit map image to be combined is switched. Since the bit map images are five through the processes of Step S20 to Step S22, when i becomes 5, the image is returned to 0.

Next, the way for sticking the bit map images will be explained. In a case where a bit map image is stuck to "still image from a camera", normally, the bit map images are superposed from the left end in the same range as that of the still image from the camera. In order to allow an image look like the moving image, the bit map images to be stuck are slightly displaced to the right from the left end. By doing so, the prepared image looks as if it moves in parallel to the left. If displaced to the left, it looks as if moving to the right, and if displaced by the width of the screen, it looks as if moving up or down.

In a case where the prepared bit map image is one, it looks merely moving, and when some images are displayed repeatedly in order, it looks like the character T walks. Here, about five bit map images are used repeatedly. Even a case of the repeating operation, for example, walking, there is an advantage that the number of images prepared can be reduced.

According to the present invention, it is possible to project a character, with story properties, on display areas of a plurality of application softwares or on the desktop screen so as to execute a plurality of application softwares in cooperation, or to instruct the operating procedure to the user.

What is claimed is:

1. An information processing apparatus for executing a plurality of software applications running on a basic software program and for displaying said plurality of software applications on a display means comprising a plurality of application display areas, said information processing apparatus comprising:

character data storage means for storing data of one or more characters to be projected on said display means following a start of said basic software program, or on each of said plurality of application display areas by executing said plurality of software applications;

scenario information storage means for storing scenario information of said software applications;

character control means for projecting said one or more characters on said plurality of application display areas of said display means following the start of the basic software program by using character data stored by said character data storage means and said scenario information stored by said scenario information storage means;

extracting means for extracting one or more desired still images or one or more desired moving image sequences from a continuous stream of data displayed on said display means; and inserting means for inserting text onto said one or more desired still images or onto said one or more desired moving image sequences of said continuous stream of data.

2. The information processing apparatus according to claim 1, wherein said character control means provides said character data to said plurality of software applications or said basic software program.

3. The information processing apparatus according to claim 1, wherein said plurality of software applications communicates with said character control means to obtain said character data, to acquire a state of said one or more characters or image information, and to display said one or more characters in said plurality of application display areas on the basis of said scenario information of each of said software applications.

4. The information processing apparatus according to claim 3, wherein, when a predetermined software application is executed, an operating procedure of the predetermined software application is displayed by said one or more characters on said plurality of application display areas following the start of the basic software program.

5. The information processing apparatus according to claim 1, wherein said information processing apparatus further comprises voice output means for outputting each piece of voice information accompanied with the execution of said plurality of software applications.

6. The information processing apparatus according to claim 5, wherein said plurality of software applications communicates with said character control means to obtain said character data, to acquire a state of said one or more characters, image information, and/or voice information, to display said one or more characters on said plurality of application display areas, and to output said voice information from said voice output means.

7. The information processing apparatus according to claim 1, wherein said character control means does not display a same character at a same time on said plurality of application display areas following the start of the basic software program.

8. The information processing apparatus according to claim 7, wherein one character is displayed as if the character comes and goes freely on said display means following the start of the basic software program and/or on said plurality of application display areas.

9. A software application executing method for executing a plurality of software applications running on a basic software program and for displaying the plurality of software applications on a display means comprising a plurality of application display areas, said software application executing method comprising a step of projecting one or more characters on a plurality of application display areas by executing said plurality of software applications following a start of said basic software program, by using character data from character data storage means for storing data of said one or more characters to be displayed on each of said plurality of application display areas and scenario information from scenario information storage means for storing the scenario information of said software applications, a step of extracting one or more desired still images or one or more desired moving image sequences from a continuous stream of data displayed on said display means and a step of inserting text onto said one or more desired still images or onto said one or more desired moving image sequences of said continuous stream of data.

10. A storage medium having stored thereon software application execution program for executing a plurality of software applications running on a basic software program and for displaying said plurality of software applications on a display means comprising a plurality of application display areas, said software application execution program comprising a step of projecting one or more characters on a plurality of application display areas by executing said plurality of software applications following a start of said basic software program, by using character data from character data storage means for storing data of said one or more characters to be displayed on each of said plurality of application display areas and scenario information from scenario information storage means for storing the scenario information of said software applications, a step of extracting one or more desired still images or one or more desired moving image sequences from a continuous stream of data displayed on said display means and a step of inserting text onto said one or more desired still images or onto said one or more desired moving image sequences of said continuous stream of data.

* * * * *